2,960,452
Patented Nov. 15, 1960

2,960,452

PREPARATION OF DIACETONE 2-KETO-GULONIC ACID

James E. Slager, Holland, Mich., and Norman D. Dawson, Elkhart, Ind., assignors to Miles Laboratories, Inc., Elkhart, Ind., a corporation of Indiana No Drawing. Filed July 14, 1958, Ser. No. 748,137

16 Claims. (Cl. 204—78)

This invention relates to the preparation of diacetone 2-ketogulonic acid by the oxidation of diacetone 1-sorbose. A simplified representation of the oxidation reaction is as follows:

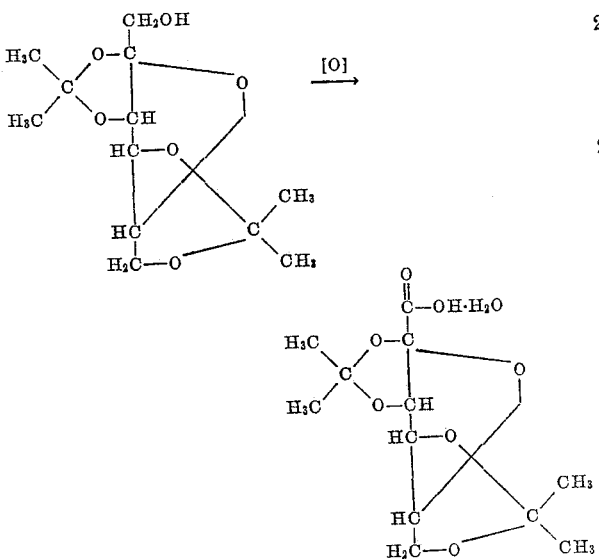

Diacetone 2-ketogulonic acid is useful chiefly as a source of 2-ketogulonic acid to which it may be readily hydrolyzed. The 2-ketogulonic acid in turn is an important intermediate in the synthesis of ascorbic acid (vitamin C) to which it is converted by procedures well-known in the art.

It is an object of the invention to provide a process for producing diacetone 2-ketogulonic acid by the oxidation of diacetone 1-sorbose with bromine in the presence of an oxidation catalyst.

An additional object of the invention is to provide a process as defined in the foregoing object, wherein the oxidation catalyst is a water-soluble inorganic nitrite or nitrate.

A further, more specific object is to provide a process of producing diacetone 2-ketogulonic acid by electrolyzing a solution of diacetone 1-sorbose containing free bromine or bromide ions, and also containing nitrite or nitrate ions.

A further object of the invention is to provide an efficient, easily controllable electrolytic process of oxidizing diacetone 1-sorbose to diacetone 2-ketogulonic acid, which process uses relatively inexpensive reactants to make up the electrolyte solution, and which operates at low current densities over relatively short periods of time to produce commercially attractive product yields of high purity.

Other objects and advantages of the invention will become apparent from the description thereof which follows:

Briefly speaking, in practicing a preferred embodiment of the present invention, oxidation of diacetone 1-sorbose is effected by electrolyzing an aqueous solution thereof containing an oxidation catalyst, a pH control agent effective to maintain the solution neutral or nearly neutral (i.e., at a pH between about 6.5 and about 8.0) throughout the oxidation step, and a water-soluble inorganic bromide or its equivalent of free bromine. During the electrolysis, the solution is preferably maintained at a temperature above ordinary room temperature, e.g., between about 45° and 55° C., by adding or subtracting heat in any convenient manner. However, operating temperatures over a much wider range, e.g., 25° to 100° C. may be used if desired. After the exothermic oxidation reaction is complete, the solution is cooled preferably to below normal room temperature, e.g., to about 5 to 10° C. The solution is then filtered and the filtrate acidified with a strong acid, preferably to about pH 1, to precipitate diacetone 2-ketogulonic acid. The product is then recovered by filtration and washed with a small amount of cold water. The temperature of the solution may be conveniently controlled at all stages by means of a water bath surrounding the reaction vessel, or by equivalent means well known in the art.

The process may be conveniently carried out in a conventional electrolytic cell fitted with a thermometer and a mechanical stirrer for mixing the reactants. When free bromine is used as the bromine source, the cell should also be provided with a dropping funnel or other suitable means for introducing the bromine into the cell.

The concentration of diacetone 1-sorbose in the reaction solution is largely a matter of choice, and we have found that the oxidation proceeds satisfactorily with concentrations of diacetone 1-sorbose between about 1% and 10% by weight of the solution. However, we prefer to use the higher concentrations of diacetone 1-sorbose in the reaction solution, e.g., between about 8% and 10% by weight.

As the oxidation catalyst, any water-soluble inorganic nitrite or nitrate, such as ammonium nitrite or nitrate, the alkali metal nitrites or nitrates such as sodium or potassium nitrite or nitrate, or the alkaline earth metal nitrites or nitrates, may be used. Amounts of the oxidation catalyst in the range of from about 0.05 to about 1.0 equivalent of catalyst per equivalent of diacetone 1-sorbose are operable, with the preferred range being from about 0.35 to about 0.45 equivalent of catalyst per equivalent of diacetone 1-sorbose. According to the convention used herein diacetone 1-sorbose comprises one gram equivalent per mole, and the equivalent values of the oxidation catalysts are determined by the number of anions per molecule of the catalyst. Thus, the alkali metal nitrites and nitrates comprise one gram equivalent per mole; the alkaline earth metal nitrites and nitrates comprise two gram equivalents per mole. The oxidation catalyst may be introduced into the electrolysis solution in its entirety at the beginning of the electrolysis, or it may be added incrementally over an extended period during the electrolysis.

In order for the present process to function, the electrolysis solution must be maintained within the pH range of about 6.5 to about 8.0, and it is for the purpose of maintaining this pH range that the aforementioned pH control agent is incorporated in the solution. The pH control agent may therefore be any basic material capable of maintaining the solution within this range, such as sodium bicarbonate, sodium carbonate, sodium hydroxide, potassium hydroxide, or various alkaline buffering compositions. We prefer sodium bicarbonate. The pH control agent may be added to the electrolysis solution at the beginning of the electrolysis or added incrementally as the electrolysis proceeds.

As noted above, the remaining essential ingredient of the solution which is electrolyzed in accordance with the present invention is either free bromine or a water-soluble inorganic bromide. Examples of the latter which may be used effectively in the present process are sodium, potassium, lithium, calcium, magnesium and strontium bromides. Of these, we prefer to use sodium bromide.

It is to be noted that when the pH control agent is a carbonate or bicarbonate, and free bromine is used as the bromine source, the addition of the bromine to the solution is accompanied by the evolution of carbon dioxide which may impose a limitation on the rate at which the bromine may be safely added. There is no similar limitation on the rate for adding the water soluble bromides to the electrolysis solution. When suitable precautions are provided for trapping the carbon dioxide formed and for removing it from the electrolytic cell, or in those instances in which the pH control agent does not evolve carbon dioxide, the bromine may be added all at one time.

In order to obtain maximum yields of diacetone 2-ketogulonic acid about 8 equivalents of bromine should be provided for each equivalent of diacetone 1-sorbose supplied to the reaction, the bromine in the electrolytic embodiment of the invention (as distinguished from our straight chemical process hereinafter described) being supplied either as free bromine or as a water-soluble inorganic bromide. More than this amount of bromine is not necessary for satisfactory conduct of the oxidation. However, in the electrolytic process the bromine which is reduced to bromide ion in the oxidation of diacetone 1-sorbose is oxidized at the anode to form bromine again, and therefore electrical energy may be substituted for a large proportion of the bromine used for oxidation of the diacetone 1-sorbose. It is because bromide ion is oxidized at the anode to free bromine that water-soluble inorganic bromides may be used instead of more expensive free bromine as the bromine source in the electrolytic embodiment of our process.

For best results, at least one equivalent of bromine per equivalent of diacetone 1-sorbose should be used in our electrolytic process; that is to say, of the eight equivalents of bromine optimumly needed for chemical oxidation of each equivalent of diacetone 1-sorbose, up to seven equivalents may be replaced by an equivalent amount of electrical energy, thereby greatly reducing the consumption of expensive elemental bromine.

As is well known, alkali metal bromides provide one gram equivalent of bromide ion per mole; free bromine of course provides two gram equivalents of bromine per mole, and the alkaline earth metal bromides, such as calcium bromide, magnesium bromide, and strontium bromide provide two gram equivalents of bromide ion per mole.

When free bromine is used as the bromine source, we prefer to use about one equivalent of bromine and about seven equivalents of electrical energy per equivalent of diacetone 1-sorbose in the reaction. Since 26.8 ampere-hours is equivalent to one gram equivalent of bromine, we use in our preferred practice about one gram equivalent of bromine and about 187.6 ampere hours per gram equivalent of diacetone 1-sorbose.

When an inorganic bromide is used as the bromine source, all of the bromine needed for the reaction is first produced by oxidation of the bromide ion at the anode during the electrolysis. Accordingly, when using bromides in the process, a full eight equivalents of electrical energy (i.e., 214.4 ampere hours) are required to produce the eight equivalents of free bromine needed for maximum yields of product. When using bromides as the bromine source, we prefer to use one equivalent thereof per equivalent of diacetone 1-sorbose in the electrolytic solution. Greater or somewhat smaller proportions of the soluble bromides may of course be used, if desired.

The current density employed for the electrolysis is determined largely by convenience and economic considerations. We prefer to use current densities at the anode of from 5 to 10 amperes/$dm.^2$, but smaller or greater current densities, e.g., from about 4 to about 20 amperes/$dm.^2$, may be used if desired.

When the oxidation is carried out in the absence of electrolytic action the source of bromine must be elemental bromine and, since the bromine reduced to bromide ion during the oxidation is not regenerated for reuse as in the electrolytic process, eight equivalents of bromine per equivalent of diacetone 1-sorbose are needed for maximum yields of diacetone 2-ketogulonic acid. However, the other conditions and reagents described above in connection with our electrolytic process, i.e., the concentrations of diacetone 1-sorbose, the character and concentrations of the oxidation catalyst, the temperature and pH ranges, and the pH control agents are applicable to the straight chemical oxidation process. When a carbonate or bicarbonate is used as the pH control agent, care should be taken to add the bromine at a rate such that the carbon dioxide evolved does not build up excessive pressures in the reaction vessel, as noted above. As in the electrolytic process, after the oxidation reaction is complete, the reaction mixture is cooled preferably to below normal room temperature, e.g., to about 5 to 10° C., the solution filtered, and the filtrate acidified with a strong acid, preferably to about pH 1, to precipitate diacetone 2-ketogulonic acid. The diacetone 2-ketogulonic acid is then recovered by filtration and washed wtih a small amount of cold water. The straight chemical oxidation embodiment of our process may be carried out in any suitable closed vessel fitted with a dropping funnel, a thermometer, and a mechanical stirrer for mixing the reactants.

The invention is illustrated in the following examples.

*Example 1*

Twenty-six grams (0.1 mole) of diacetone 1-sorbose, 10 g. of sodium bromide, and 10 g. of sodium bicarbonate were dissolved in 220 ml. of water, and the solution was transferred to an electrolytic cell containing 2 carbon electrodes and a mechanical stirrer for mixing the components during the electrolysis. The solution was electrolyzed using a current density at the anode of 10 amp./$dm.^2$ (the area of the anode was 0.6 $dm.^2$) and at a temperature of 50–55° C. During the course of the electrolysis there was added to the solution being electrolyzed a solution consisting of 10 g. of sodium nitrite dissolved in 20 ml. of water. The sodium nitrite solution was added dropwise over a 4½ hour period, after which the electrolysis was allowed to continue for an additional ½ hour. A total of 30 amp. hours was passed through the reaction mixture. The reaction mixture was then cooled to 5 to 10° C. and filtered, and the filtrate acidified with concentrated hydrochloric acid to a pH of 1. This precipitated the diacetone 2-ketogulonic acid, which was removed by filtration and washed with a small amount of cold water, and air-dried. The yield of diacetone 2-ketogulonic acid was 20.5 g., which corresponds to 70% of the theoretical yield.

*Example 2*

In order to demonstrate the importance of the catalyst in the present process, there was charged into the electrolytic cell the same amount of diacetone 1-sorbose, sodium bromide, and sodium bicarbonate, as in Example 1, but during the electrolysis no sodium nitrite was added. In this run, no diacetone 2-ketogulonic acid was isolated.

*Example 3*

To demonstrate the importance of the pH control agent in the process, an electrolytic cell was charged with diacetone 1-sorbose and sodium bromide, and the solution subjected to electrolysis while sodium nitrite was added, as in Example 1. However, in this run, no sodium bicarbonate was included in the solution being electrolyzed. No diacetone 2-ketogulonic acid was isolated.

*Example 4*

Twenty-six grams (0.1 mole) of diacetone 1-sorbose, 10 g. of sodium bicarbonate, 10 g. of sodium bromide, and 10 g. of sodium nitrate were dissolved in 250 ml. of water, and the solution was transferred to an electrolytic cell containing 2 carbon electrodes and a mechanical stirrer for mixing the components during the electrolysis. The subsequent oxidation was carried out at a current density at the anode of 10 am./dm.$^2$ and at a temperature of 25 to 30° C. The electrolysis was allowed to proceed for 5 hours with a total of 30 amp. hours being passed through the reaction mixture. The mixture was then cooled to 5 to 10° C. and filtered, and the filtrate acidified with concentrated hydrochloric acid to a pH of 1. This precipitated the diacetone 2-ketogulonic acid, which was removed by filtration and washed with a small amount of cold water, and air-dried. The yield of diacetone 2-ketogulonic acid was 15 g., which assayed at 89% purity. This corresponds to 45% of the theoretical yield.

*Example 5*

Twenty-six grams (0.1 mole) of diacetone 1-sorbose, 10 g. of sodium bicarbonate, 8.5 g. of sodium nitrate, and 10 g. of sodium bromide were dissolved in 250 ml. of water, and the solution transferred to an electrolytic cell. The electrolytic cell was equipped with a mechanical stirrer for mixing of the components during the electrolysis. The subsequent oxidation was carried out at a current density at the anode of 5 amp./dm.$^2$ at a temperature of 30° C. A total of 36 amp. hours was passed through the reaction mixture. After 6 hours of reaction time the reaction mixture was cooled to 5 to 10° C. and filtered, and the filtrate acidified with concentrated hydrochloric acid to a pH of 1. The precipitated diacetone 2-ketogulonic acid was removed by filtration, washed with cold water, and air-dried. The yield of the acid was 9 g. of an acid assaying 85.6%. This represents a yield of 25% of theoretical.

*Example 6*

The process of Example 5 was repeated using 1 g. of sodium nitrate instead of 8.5 g. In this instance the yield obtained was 11 g. of the acid assaying 85.3% which represents 35% of the theoretical yield.

*Example 7*

A reaction solution made up of 52 g. of diacetone 1-sorbose, 40 g. of sodium bicarbonate, 5 g. of sodium nitrite and 20 g. of bromine, in 500 ml. of water, was electrolyzed over a period of about 6¼ hours using about 0.96 ampere-hours of electricity per gram of diacetone 1-sorbose. The temperature maintained during the electrolysis was about 35° C. The yield of diacetone 2-ketogulonic acid, which was recovered from the reaction mixture in the same manner set forth in Example 1, was 45 g. (74.0% of theoretical).

We claim:

1. A process of producing diacetone 2-ketogulonic acid which comprises treating diacetone 1-sorbose in aqueous solution with bromine in the presence of an oxidation catalyst selected from the group consisting of water-soluble inorganic nitrites and nitrates, while maintaining the pH of said solution between about 6.5 and about 8.0.

2. A process in accordance with claim 1 wherein said oxidation catalyst is used in an amount between about 0.05 and 1.0 equivalent per equivalent of diacetone 1-sorbose.

3. A process in accordance with claim 2 wherein said oxidation catalyst is sodium nitrite and is used in an amount between about 0.35 and 0.45 equivalent per equivalent of diacetone 1-sorbose.

4. In a process of producing diacetone 2-ketogulonic acid by the oxidation of diacetone 1-sorbose, the step of treating diacetone 1-sorbose in aqueous solution with bromine in the presence of an oxidation catalyst selected from the group consisting of ammonium nitrite and nitrate, the alkali metal nitrites and nitrates and the alkaline earth metal nitrites and nitrates, while maintaining the pH of said solution between about 6.5 and about 8.0, the temperature of the reactants during said treatment being maintained between about 45° and 55° C., the amount of said bromine used in said treatment being about eight equivalents per equivalent of diacetone 1-sorbose.

5. In a process for producing diacetone 2-ketogulonic acid, the step of subjecting to electrolysis an aqueous solution of (a) diacetone 1-sorbose, (b) a member of the group consisting of bromine and the water-soluble inorganic bromines, and (c) a member of the group consisting of the water-soluble inorganic nitrites and nitrates, while maintaining such solution at a pH of between about 6.5 and 8.0.

6. The process of producing diacetone 2-ketogulonic acid comprising subjecting to electrolysis an aqueous solution of (a) diacetone 1-sorbose, (b) a member of the group consisting of bromine and the water-soluble inorganic bromides, and (c) a member of the group consisting of the water-soluble inorganic nitrites and nitrates, while maintaining the pH of said solution between about 6.5 and about 8.0, the diacetone 1-sorbose being present in said solution in an amount between about 1% and about 10% by weight, said member of said first mentioned group being used in said solution in an amount between about one equivalent and about eight equivalents thereof per equivalent of said diacetone 1-sorbose, said member of said second mentioned group being used in said solution in an amount between about 0.05 and about 1.0 equivalent thereof per equivalent of diacetone 1-sorbose.

7. The process in accordance with claim 6 wherein said solution is maintained at a temperature between about 25° C. and about 100° C., and the electrolyzing current density at the anode is maintained between about 4 and 20 amperes/dm.$^2$.

8. The process in accordance with claim 6 wherein the concentration of diacetone 1-sorbose in said solution is about 8%–10% by weight, said member of said second mentioned group is used in an amount between about 0.35 and 0.45 equivalent per equivalent of diacetone 1-sorbose, and wherein the current density during said electrolysis is between about 5 and 10 amperes/dm.$^2$ at the anode.

9. In a process of producing diacetone 2-ketogulonic acid, the step of subjecting to electrolysis an aqueous solution of diacetone 1-sorbose, sodium bromide, sodium nitrite and sodium bicarbonate, the diacetone 1-sorbose being present in said solution in an amount between about 1% and about 10% by weight, said sodium bromide being present in said solution in the amount of about one equivalent thereof per equivalent of said diacetone 1-sorbose, said sodium nitrite being present in said solution in an amount between about 0.05 and about 1.0 equivalent thereof per equivalent of diacetone 1-sorbose, said sodium bicarbonate being present in an amount adapted to maintain the pH of said solution between about 6.5 and about 8.0 during the electrolysis.

10. The process according to claim 9 wherein the temperature of said solution is maintained between about 45° and about 55° C. during said electrolysis.

11. In a process of producing diacetone 2-ketogulonic acid, the steps of providing an aqueous solution containing between about 8% and about 10% by weight of diacetone 1-sorbose, and also containing sodium bromide in the amount of about one equivalent thereof per equivalent of said diacetone 1-sorbose, electrolyzing said solution, maintaining said solution at a pH between about 6.5 and about 8.0 during said electrolysis by the addition thereto of an alkaline-reacting substance, and adding to said solution during the electrolysis a member of the group consisting of the water-soluble inorganic nitrites and nitrates in an amount between 0.35 and 0.45 equivalent thereof per equivalent of diacetone 1-sorbose.

12. In a process of producing diacetone 2-ketogulonic acid, the steps of providing an aqueous solution containing between about 8% and about 10% by weight of diacetone 1-sorbose, and also containing a member of the group consisting of bromine and the bromides of sodium, potassium, lithium, calcium, magnesium, and strontium in an amount between about one equivalent and about eight equivalents thereof per equivalent of said diacetone 1-sorbose, electrolyzing said solution between carbon electrodes using a current density at the anode of between about 4 and about 20 amperes/dm.$^2$, maintaining the pH of said solution between about 6.5 and about 8.0 during the electrolysis by the addition thereto of sodium hydroxide, and adding sodium nitrite to said solution during the electrolysis in an amount between about 0.35 and 0.45 equivalent thereof per equivalent of said diacetone 1-sorbose.

13. In the process of producing diacetone 2-ketogulonic acid, the steps of providing an aqueous solution of diacetone 1-sorbose, sodium bromide, and sodium bicarbonate, the diacetone 1-sorbose being present in said solution in an amount between about 8% and about 10% by weight, said sodium bromide being present in said solution in the amount of about one equivalent thereof per equivalent of said diacetone 1-sorbose, said sodium bicarbonate being present in said solution in an amount adapted to maintain the pH thereof between about 6.5 and about 8.0 during the subsequent electrolysis, electrolyzing said solution between carbon electrodes using a current density at the anode of between about 4 and about 20 amperes/dm.$^2$, adding to said solution during said electrolysis, in aqueous solution, sodium nitrite in an amount between about 0.35 and 0.45 equivalent per equivalent of said diacetone 1-sorbose, and continuing said electrolysis until about 214.4 ampere-hours are used per gram equivalent of diacetone 1-sorbose.

14. In a process of producing diacetone 2-ketogulonic acid, the step of subjecting to electrolysis an aqueous solution of diacetone 1-sorbose, bromine and a member of the group consisting of the water-soluble inorganic nitrites and nitrates, while maintaining the pH of said solution between about 6.5 and about 8.0, the diacetone 1-sorbose being present in said solution in an amount between about 1% and about 10% by weight, said bromine being used in said solution in an amount between about one gram equivalent and about eight gram equivalents per gram equivalent of said diacetone 1-sorbose, said member of said group being used in said solution in an amount between about 0.05 and about 1.0 gram equivalent per gram equivalent of diacetone 1-sorbose, 26.8 ampere-hours of electricity being used in the electrolysis for each gram equivalent of bromine less than eight.

15. In a process for producing diacetone 2-ketogulonic acid, the step of subjecting to electrolysis an aqueous solution of diacetone 1-sorbose, bromine and a member of the group consisting of the water-soluble inorganic nitrites and nitrates, while maintaining the pH of said solution between about 6.5 and about 8.0, the diacetone 1-sorbose being present in said solution in an amount between about 1% and about 10% by weight, said bromine being used in said solution in the amount one gram equivalent per gram equivalent of said diacetone 1-sorbose, said member of said group being used in said solution in an amount between about 0.05 and about 1.0 gram equivalent per gram equivalent of diacetone 1-sorbose, 187.6 ampere-hours of electricity being used in the electrolysis per gram equivalent of diacetone 1-sorbose.

16. In a process of producing diacetone 2-ketogulonic acid, the step of subjecting to electrolysis an aqueous solution of diacetone 1-sorbose, bromine and sodium nitrite, while maintaining the pH of said solution between about 6.5 and about 8.0, the diacetone 1-sorbose being present in said solution in an amount between about 8% and about 10% by weight, said bromine being used in said solution in the amount of about one gram equivalent of bromine per gram equivalent of diacetone 1-sorbose, said sodium nitrite being used in said solution in an amount between about 0.35 and about 0.45 gram equivalent per gram equivalent of diacetone 1-sorbose, 187.6 ampere-hours of electricity being used in the electrolysis per gram equivalent of diacetone 1-sorbose.

References Cited in the file of this patent

UNITED STATES PATENTS

| | | |
|---|---|---|
| 1,937,273 | Helwig | Nov. 28, 1933 |
| 1,976,731 | Isbell | Oct. 16, 1934 |
| 2,222,155 | Pasternack et al. | Nov. 19, 1940 |
| 2,367,251 | Weijlard et al. | Jan. 16, 1945 |
| 2,559,033 | Verheyden | July 3, 1951 |
| 2,559,034 | Verheyden | July 3, 1951 |